(12) United States Patent
Hill et al.

(10) Patent No.: US 6,775,256 B1
(45) Date of Patent: Aug. 10, 2004

(54) PACKET SCHEDULER AND METHOD THEREFOR

(75) Inventors: Stephen Hill, Swindon (GB); Peter Legg, Wroughton (GB); Stephen Barrett, South Wonston (GB); Eric Villier, Swindon (GB)

(73) Assignee: Motorola, Inc., Schaumburg, IL (US)

( * ) Notice: Subject to any disclaimer, the term of this patent is extended or adjusted under 35 U.S.C. 154(b) by 772 days.

(21) Appl. No.: 09/654,865

(22) Filed: Sep. 5, 2000

(30) Foreign Application Priority Data

Jan. 19, 2000 (GB) .............................................. 0001212

(51) Int. Cl.⁷ ............................................... H04B 7/216
(52) U.S. Cl. ........................ 370/335; 370/342; 455/522
(58) Field of Search ................................ 370/310, 328, 370/329, 335, 318, 332, 341, 342, 348, 395, 414, 441, 468; 455/67.1, 455, 522; H04B 7/00, 7/26, 7/185, 7/216, 7/005; H01J 3/16, 3/22; H04L 12/56; H04Q 7/00, 7/22, 7/28, 7/38

(56) References Cited

U.S. PATENT DOCUMENTS

| | | | | |
|---|---|---|---|---|
| 5,914,950 A | * | 6/1999 | Tiedemann et al. | ......... 370/348 |
| 6,097,969 A | | 8/2000 | Angus et al. | |
| 6,597,705 B1 | * | 7/2003 | Rezaiifar et al. | ........... 370/468 |

FOREIGN PATENT DOCUMENTS

| | | | | |
|---|---|---|---|---|
| WO | WO 9507578 A1 | * | 3/1995 | ............ H04B/7/26 |
| WO | WO 98/35514 | | 8/1998 | |
| WO | WO 00/14900 | | 3/2000 | |

OTHER PUBLICATIONS

"Packet Data Transmission in a W–CDMA Network–13 Examples of Uplink Scheduling and Performance." By Eric Villier, Peter Legg, and Stephen Barrett; VTC2000: 51$^{st}$ Vehicular Technology Conference 2000. vol. 3, May 18, 2000, pp. 2449–2453.

* cited by examiner

Primary Examiner—Steven Nguyen

(57) ABSTRACT

This invention relates to a packet scheduler and method therefor and in particular a scheduler for a Code Division Multiple Access cellular mobile communication system. In packet base systems it is important to schedule transmissions of packets carefully in order to maximize the capacity of the system. The scheduler has a selection unit (233) for selecting a candidate set of packets. The candidate set is fed to a processor (235) for calculating transmit powers required by remote terminals to transmit the packets based on the candidate set. The calculated transmit powers are fed to a controller (237) for modifying the candidate set in response to the calculated transmit powers and the modified set is fed to a scheduler unit (239) for scheduling the packets of the candidate set for transmission. The scheduler is in particular appropriate for third generation mobile communication systems.

9 Claims, 2 Drawing Sheets

-PRIOR ART-

PACKET SCHEDULER AND METHOD THEREFOR

FIELD OF THE INVENTION

This invention relates to a packet scheduler and method therefor, and in particular to a packet scheduler for a cellular communication system for mobile communication.

BACKGROUND OF THE INVENTION

In a cellular communication system each of the remote terminals (typically mobile stations) communicates with typically a fixed base station. Communication from the remote terminal to the base station is known as uplink and communication from the base station to the remote terminal is known as downlink. The total coverage area of the system is divided into a number of separate cells, each predominantly covered by a single base station. The cells are typically geographically distinct with an overlapping coverage area with neighbouring cells. FIG. 1 illustrates a cellular communication system 100. In the system, a base station 101 communicates with a number of remote terminals 103 over radio channels 105. In the cellular system, the base station 101 covers users within a certain geographical area 107, whereas other geographical areas 109, 111 are covered by other base stations 113, 115.

As a remote terminal moves from the coverage area of one cell to the coverage area of another cell, the communication link will change from being between the remote terminal and the base station of the first cell, to being between the remote terminal and the base station of the second cell. This is known as a handover. Specifically, some cells may lie completely within the coverage of other larger cells.

All base stations are interconnected by a fixed network. This fixed network comprises communication lines, switches, interfaces to other communication networks and various controllers required for operating the network. A call from a remote terminal is routed through the fixed network to the destination specific for this call. If the call is between two remote terminals of the same communication system the call will be routed through the fixed network to the base station of the cell in which the other remote terminal currently is. A connection is thus established between the two serving cells through the fixed network. Alternatively, if the call is between a remote terminal and a telephone connected to the Public Switched Telephone Network (PSTN) the call is routed from the serving base station to the interface between the cellular mobile communication system and the PSTN. It is then routed from the interface to the telephone by the PSTN.

A cellular mobile communication system is allocated a frequency spectrum for the radio communication between the remote terminals and the base stations. This spectrum must be shared between all remote terminals simultaneously using the system.

One method of sharing this spectrum is by a technique known as Code Division Multiple Access (CDMA). In a Direct Sequence CDMA (DS-CDMA) communication system, the signals are prior to being transmitted multiplied by a high rate code whereby the signal is spread over a larger frequency spectrum. A narrowband signal is thus spread and transmitted as a wideband signal. At the receiver the original narrowband signal is regenerated by multiplication of the received signal with the same code. A signal spread by use of a different code will at the receiver not be de-spread but will remain a wide band signal. In the receiver the majority of interference caused by interfering signals received in the same frequency spectrum as the wanted signal can thus be removed by filtering. Consequently a plurality of remote terminals can be accommodated in the same wideband spectrum by allocating different codes for different remote terminals. Codes are chosen to minimise the interference caused between remote terminals typically by choosing orthogonal codes when possible. A further description of CDMA communication systems can be found in 'Spread Spectrum CDMA Systems for Wireless Communications', Glisic & Vucetic, Artech house Publishers, 1997, ISBN 0-89006-858-5. Examples of CDMA cellular communication systems are IS 95 standardised in North America and the Universal Mobile Telecommunication System (UMTS) currently under standardisation in Europe.

Traditional traffic in mobile cellular communication systems has been circuit switched voice data where a permanent link is set up between the communicating parties. In the future it is envisaged that data communication will increase substantially and typically the requirements for a remote terminal to transmit data will not be continuous but will be at irregular intervals. Consequently it is inefficient to have a continuous link setup between users and instead a significant increase in packet based data traffic is expected, where the transmitting remote terminal seeks to transmit the data in discrete data packets when necessary. An example of a packet based system is General Packet Radio Service (GPRS) introduced to the Global System for Mobile communication (GSM). Further details on data packet systems can be found in 'Understanding data communications: from fundamentals to networking, $2^{nd}$ ed.', John Wiley publishers, author Gilbert Held, 1997, ISBN 0-471-96820-X.

In a packet based system where a high number of remote terminals may require resources for packet transmissions at unknown and irregular intervals it is important for optimal utilisation of the limited resource to schedule the order and time for transmission of the individual packets. This becomes even more important when different data packets have different requirements with respect to delay, bit error rate etc. Therefore most packet based systems contain schedulers which control when the individual data packets are transmitted and therefore share the available resource, whether time-slots in a TDMA system or power and codes in a CDMA system. An introduction to schedulers can be found in 'Service discipline for guaranteed performance service in packet-switching networks', Hui Zhang, Proceedings of the IEEE, volume 83, no. 10, October 1995.

However, known schedulers have been optimised for different environments than CDMA systems. For example, scheduling algorithms used for GPRS are optimised for a Time Division Multiple Access (TDMA) system and therefore not optimal for CDMA systems where codes and power must be shared.

SUMMARY OF THE INVENTION

The inventors of the current invention have realised that conventional approaches for scheduling of data packets can be improved in a CDMA system by considering parameters specific to CDMA when scheduling.

Accordingly there is provided a method of packet scheduling for a Code Division Multiple Access cellular communication system having a number of cells, each cell having a base station serving at least one remote terminal, the method comprising the steps of: selecting a candidate set of packets: based on the candidate set calculating transmit powers required to transmit the packets; modifying the candidate set in response to the calculated transmit powers; and scheduling the packets of the candidate set for transmission.

By scheduling packets in response to an calculation of transmit powers required to support a given candidate set of packets, the invention provides an improvement in the resource utilisation (the fraction of the available resource which is exploited by the scheduler whilst meeting the agreed quality of service for the supported circuit and packet connections) or capacity, whilst at the same time running at low complexity.

Preferably the step of modifying the candidate cells and the calculation of transmit powers are iterated until a final candidate set has been determined, where the final set is preferably the first set for which all packets awaiting transmission have been in the candidate set at least once.

According to a second aspect of the invention there is provided a packet scheduler for a Code Division Multiple Access cellular communication system having a number of cells each cell having a base station serving at least one remote terminal, the scheduler comprising: means for selecting a candidate set of packets; means for calculating transmit powers required by remote terminals to transmit the packets based on the candidate set; means for modifying the candidate set in response to the calculated transmit powers; and means for scheduling the packets of the candidate set for transmission.

BRIEF DESCRIPTION OF THE DRAWINGS

An embodiment of the present invention is described below, by way of example only, with reference to the Drawings, in which.

DETAILED DESCRIPTION OF A PREFERRED EMBODIMENT

The following description focuses on an embodiment compliant with the current approach for the standardisation of UMTS but it will be apparent that the invention is not limited to this application. The description here also focuses on the uplink scenario for clarity but the invention is equally applicable to the down link scenario.

Figure 2:
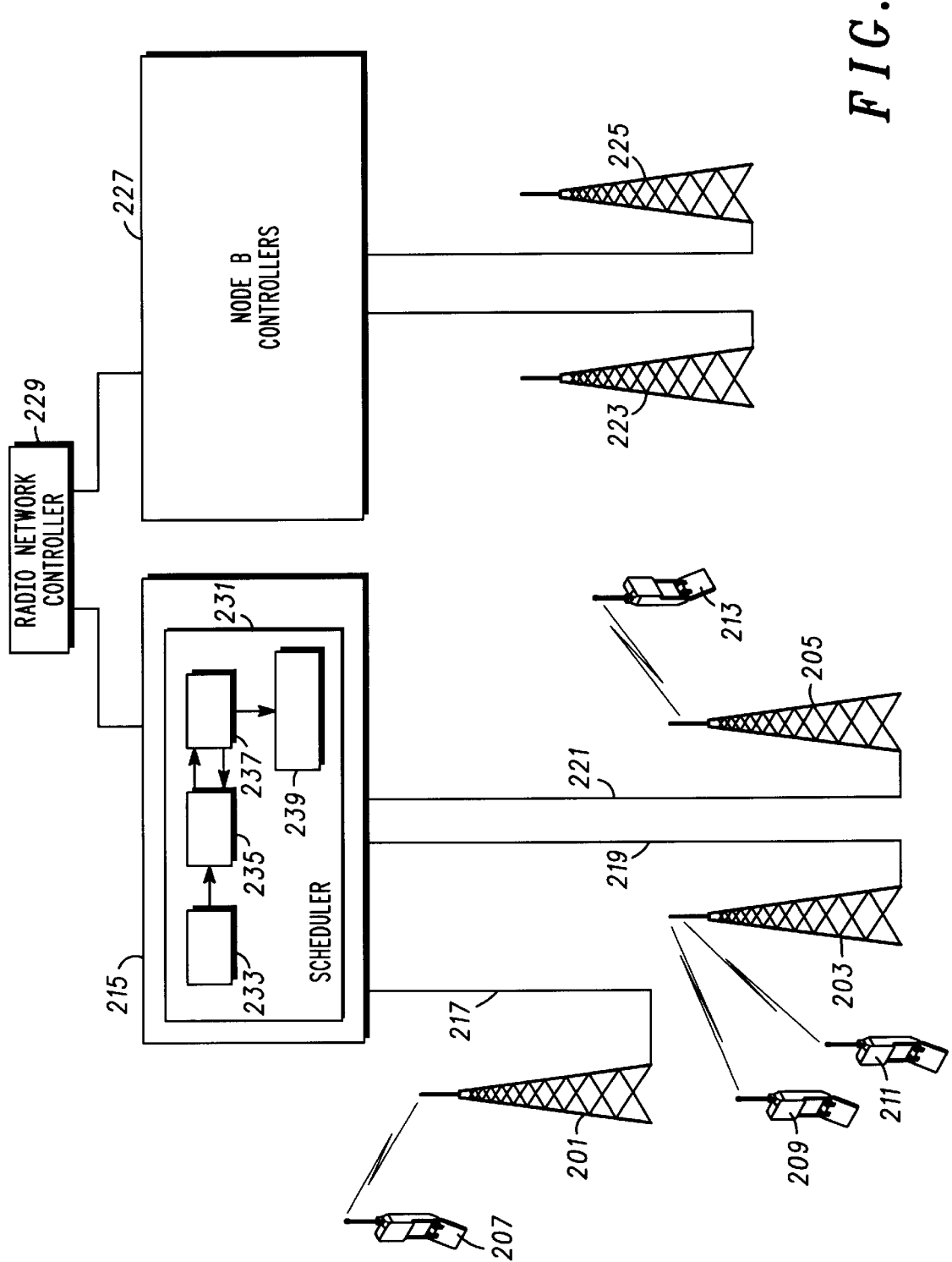
FIG. 2 is an illustration of an embodiment of a CDMA communication system in accordance with the invention.

FIG. 2 shows a schematic diagram of an embodiment of a CDMA communication system in accordance with an embodiment of the invention. The communication system has a number of base stations 201–205 each covering a geographical area and thereby defining a cell. A number of remote terminals 207–213 are associated with the communication system and communicate to each other or to other systems via the base stations 201–205.

The base stations 201–205 are connected to a common controller 215 known as a Node B in UMTS, via communication links 217–221. Other base stations 223,225 are connected to other Node B controllers 227, and the Node B controllers are connected together through a Radio Network Controller (RNC) 229. The RNC further provides gateways to other communication systems such as the fixed public telephone system.

Each of the remote terminals 207–213 have independent communication needs and communicate by use of data packets. Alternatively some of the remote terminals 207–213 may communicate by use of circuit switched connections. The remote terminals 207–213 may require different services and can for example be Internet browsers, telephones or data terminals. Each remote terminal may also request different services at different times.

The resource requirement for each individual remote terminal 207–213 may vary significantly over time so that a remote terminal 207–213 may sometimes require no transmissions and at other times require long transmissions at high data rate. The resource requirement for each terminal from the communication system can thus vary significantly and in order to ensure that the available resource is used optimally an efficient scheduling of packets from the different remote terminals is required. This task is performed by the scheduler 231 here shown as part of the Node B controller 215. Another possibility is for the scheduler to be in a Radio Network Controller 229.

In CDMA the total data throughput is limited by the interference at the receiver caused by transmissions to other users. Since a single cell re-use of carrier frequency is employed interference may originate from connections within the same cell (intra-cell interference) or from adjacent cells (inter-cell interference). A successful sharing of the available power in a cell requires an accurate knowledge of these interference levels so that the signal to noise ratio for each connection is appropriate for the desired block error rate. In order to perform an optimal allocation remote terminals in all other cells of the communication system must therefore be taken into account and a scheduling of all packets in all cells must be done simultaneously. However, this will result in extremely high complexity of the scheduler and increase the load on communication lines between the scheduler and the base stations. Rather than have a single scheduler for an entire network, a scheduler is implemented for a cluster of cells. The size of this cluster will depend on the acceptable complexity of the scheduler, but can typically be in order of 100 cells. However, the cluster size is perceivable as anything from two cells to all cells of the communication system. The cells for each cluster are typically chosen so that a cluster covers a single geographical area.

The scheduler 231 comprises means 233 for selecting a candidate set of packets. These means communicate with means 235 for calculating transmit powers required by remote terminals to transmit the packets based on the candidate sets. The results of this calculation are fed to means 237 for modifying the candidate set in response to the calculated transmit powers and the results of the modification can be fed back to the means 235 for calculating transmit powers required by remote terminals to transmit the packets based on the candidate sets or can be fed to means 239 for scheduling the packets of the candidate sets for transmission.

Figure 1:
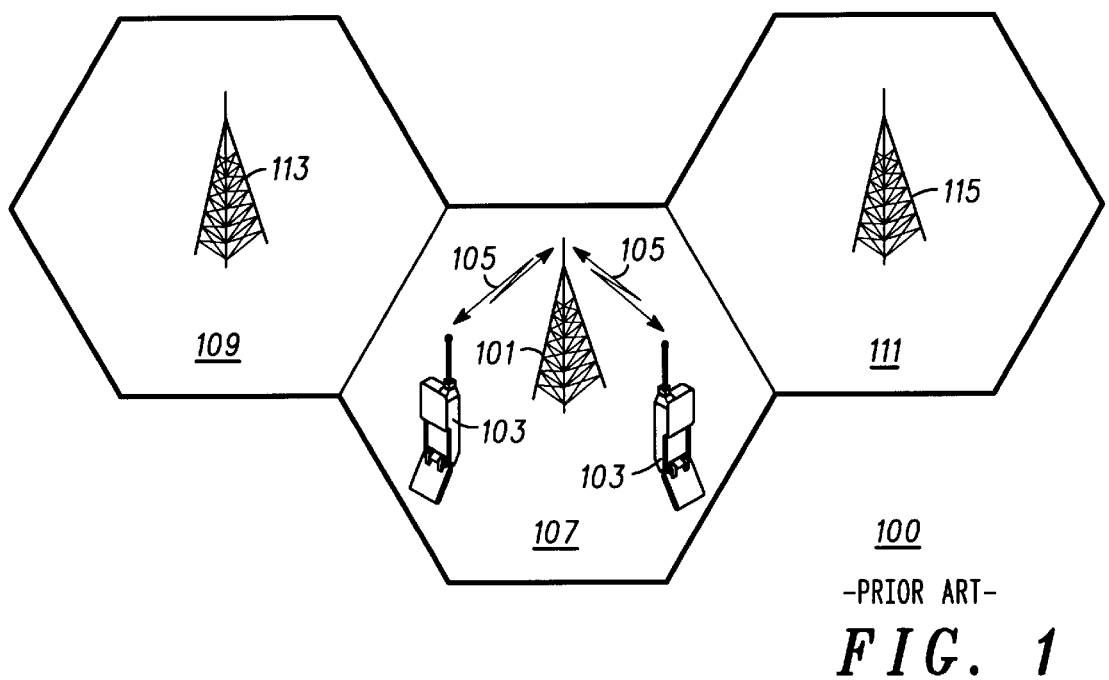
FIG. 1 is an illustration of a cellular communication system according to prior art.
Figure 3:
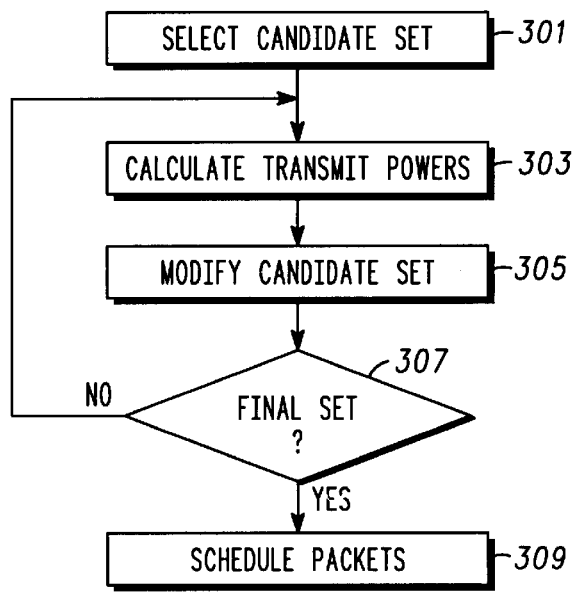
FIG. 3 illustrates a flow chart of a method of scheduling in accordance with an embodiment of the invention.

Operation in accordance with an embodiment of the invention is illustrated in flow chart diagram form in FIG. 3.

In step 301 a candidate set of packets is selected.

In a frame based communication system such as UMTS, the communication is divided into discrete time intervals or frames and the communication resource is allocated in granularity of a single frame. In UMTS the packets to be transmitted in one time frame are scheduled and communicated to the remote terminals in the previous time frame. A remote terminal will transmit a request to the fixed network.

The resource request includes the size of the queued packets together with Quality of Service related information, e.g., time of arrival, priority, bit error rate. This will be communicated to the scheduler, which will include the request in a list of packets to be scheduled.

In step 301 a candidate set is selected from this list. The candidate set is the set of packets, which are currently targeted for scheduling. The initial candidate set can in principle comprise all packets, which have been requested for transmission. However, in accordance with the current embodiment a subset of the packets are currently selected according to a simple known scheduling process. An example of such a scheduling process is a scheduler which simply allocates packets according to the rule that the level of interference produced at the target base station by the transmission of a given packet is below a chosen threshold.

Another example is a scheduler, which operates on a cluster of cells, possibly all the cells under the control of an RNC. In each cell, a maximum noise rise is defined. This quantity leads to a maximum level of interference tolerable at the receiver in each cell. For each packet awaiting transmission, the required transmit power at the mobile is computed, assuming the path loss (between the mobile and the first cell in its active set) and Signal to Noise target are known quantities. Each packet is considered in turn without consideration of other packets but assuming that the level of interference in the cell is the maximum level of tolerable interference. If the required power is beyond the mobile's capability, then the packet is not scheduled. Otherwise the interference created by that mobile in the other cells is computed (assuming the path losses between the mobile and the neighbouring cells are known): if the interference generated is still within the budget of each cell, then the packet is definitely scheduled, otherwise it is skipped and the next packet in the queue is examined.

As the calculation above, and thus the selection of packets, is based on an assumption of the interference level being maximum for all cells, it represents a conservative approach. The resulting initial candidate set is therefore likely to not include all cells, which possibly can be scheduled.

In step 303 the transmit powers required to transmit the packets is calculated based on the packets in the candidate set. This transmit power is calculated for each remote terminal and takes into consideration all the other packets to be transmitted according to the current candidate set.

The required transmit power on each link can be computed in several ways. A possibility is to solve directly a linear system of equations where an equation for each link and packet is given by $$P_{tx,i} = L_i \cdot \left( \sum_{j \neq i} P_{tx,j} / L_j + I_{intercluster} + N_{th} \right) \cdot SNR_i \quad (1)$$

where $P_{tx,i}$ is the transmit power of user i $L_i$ is the path loss between user i and the base station for receiving packets $I_{intercluster}$ is the aggregate interference at the BTS from users outside the cluster $N_{th}$ is the thermal noise power at the BTS receiver and $SNR_i$ is the required signal to noise ratio of the link for supporting the packet.

Alternatively, the transmit powers can be calculated by simulating power control loops for the individual links. In that case, the effect of each link is computed sequentially: links are added one by one within the system, and the level of interference created at each base station, and hence the correction of the transmit power to be applied to each link is computed iteratively until convergence is reached. When this power control loop has converged, a new link is added into the system, and the same loop is applied.

Based on the calculation of the transmit powers in step 303 the candidate set is modified in step 305. If the calculation has shown that the transmit powers rise above a certain level or are infinite, it is clear that the system does not have the capacity to support all packets in the candidate set. Therefore one or more packets are removed from the candidate set. Alternatively if the calculation of step 305 have shown that the transmit powers and the interference levels at the base stations are below a threshold, the system have capacity for scheduling more packets and therefore packets are added to the candidate set.

In the current embodiment, 44 in step 307 investigated whether a final candidate set has been determined. If this is not the case the scheduler proceeds at step 303 by performing a new calculation of transmit powers based on the modified candidate set. This iteration continues until a final candidate set has been determined.

The rules by which packets are added to or removed from the candidate set can be very simple or more complex. In the simplest case a packet is simply added or removed randomly. A more sophisticated approach is to add and remove packets in order of priority of for example delay constraints. Alternatively the packets to be removed, if the transmit power requirements are not met, can be the packets that were added at the last iteration of the scheduler. In this case the previous iteration has resulted in an acceptable allocation of packets and therefore the candidate set has been increased by additional packets. However the current iteration has resulted in an unacceptable allocation and therefore by removing the packets that were added in the previous iteration the candidate set is returned to the last known acceptable set.

The determination of whether a final candidate set has been reached or not can be determined before or after the candidate set is modified. Even if a final candidate set is determined before the modification this set may be modified in response to the calculation of transmit powers before the scheduler continues at step 309.

A number of different criteria can be used to determine whether a final set has been reached. These criteria can be used independently but are preferabley used in combination. The criteria include that a final set is considered to be reached when the transmit power calculation results in a transmit power or interference level above a certain threshold. In this case the packets added in the last iteration are removed and the scheduler proceeds in step 309.

Alternatively a final candidate set can be considered to be reached when all waiting packets have been scheduled or a real time constraint for the scheduler has been reached, i.e. that the scheduling has taken too long a time. Another possibility Is for the final candidate set to be considered the one for which all packets have been considered at least once, i.e. that they have been in the candidate set at least once even if they have consequently been removed from the set.

In step 309 the packets of the candidate cells are scheduled for transmission. This scheduling includes find allocation of packets to base station based on the assumption used for calculating transmit powers. The information about which packets have been scheduled is communicated to the base stations of the cluster which communicates the information to the remote terminals.

In the example presented the scheduler is located in the Node B controller but in principle the scheduler can in principle be situated anywhere in the communication system or can be distributed over a plurality of components in the network.

The scheduler is typically implemented as a software program running on a suitable processor such as a microprocessor or a digital signal processor.

The scheduler described has a number of advantages including high resource utilisation (the fraction of the available resource which is exploited by the scheduler whilst meeting the agreed quality of service for the supported circuit and packet connections) or capacity, resulting from the accurate handling of intercell interference, low complexity of operation, and robustness (the schedule generated meets the signal to noise requirements of every packet scheduled under averaged fading conditions).

What is claimed is:

1. A method of packet scheduling for a Code Division Multiple Access cellular communication system having a number of cells each cell having a base station serving at least one remote terminal, the method comprising the steps of:
   a scheduler serving two or more cells selecting a candidate set of packets from among said two or more cells;
   based on the candidate set, calculating transmit powers required to transmit the packets;
   modifying the candidate set in response to the calculated transmit powers; and
   scheduling the packets of the candidate set for transmission.

2. A method of packet scheduling as claimed in claim 1 wherein the step of modifying the candidate and the calculation of transmit powers are iterated until a final candidate set has been determined.

3. A method of packet scheduling as claimed in claim 2 wherein the final set is the first set for which all packets awaiting transmission have been in the candidate set at least once.

4. A method of packet scheduling as claimed in claim 2 wherein the final set is the first set for which at least one transmit power is above a threshold.

5. A method of packet scheduling as claimed in claim 1 wherein the transmit powers are calculated in response to required signal to noise ratios of the packets.

6. A method of packet scheduling as claimed in claim 5 wherein the transmit powers are determined by simulating power control loops for a plurality of remote terminals.

7. A method of packet scheduling as claimed in claim 1 wherein the step modifying of the candidate set includes adding at least one packet when the transmit powers are below a threshold.

8. A method of packet scheduling as claimed in claim 1 wherein the step modifying of the candidate set includes removing at least one packet when at least one transmit power is above a threshold.

9. A packet scheduler for a Code Division Multiple Access cellular communication system having a number of cells each cell having a base station serving at least one remote terminal, the scheduler serving two or more cells and comprising:
   a selection unit for selecting a candidate set of packets from among said two or more cells;
   a processor for calculating transmit powers required by remote terminals to transmit the packets based on the candidate set;
   a controller for modifying the candidate set in response to the calculated transmit powers; and
   a scheduling unit for scheduling the packets of the candidate set for transmission.

* * * * *